United States Patent [19]

Lichius

[11] 4,085,347

[45] Apr. 18, 1978

[54] LAMINATED STATOR CORE

[75] Inventor: Kenneth Walter Lichius, Etowah, Tenn.

[73] Assignee: White-Westinghouse Corporation, Pittsburgh, Pa.

[21] Appl. No.: 649,859

[22] Filed: Jan. 16, 1976

[51] Int. Cl.² .............................................. H02K 1/12
[52] U.S. Cl. ..................... 310/259; 310/42; 310/43; 310/217; 336/210; 336/219
[58] Field of Search ............. 310/254, 259, 216, 217, 310/192, 42, 43, 258, 179, 180, 191, 193, 218; 156/322, 305; 336/210, 219

[56] References Cited

U.S. PATENT DOCUMENTS

| | | | |
|---|---|---|---|
| 3,122,667 | 2/1964 | Baciu | 310/259 |
| 3,465,188 | 9/1969 | Sisk | 310/217 |
| 3,490,143 | 1/1970 | Hull | 310/42 |
| 3,512,902 | 5/1970 | Emmons | 310/217 |
| 3,591,819 | 7/1971 | Laing | 310/217 |
| 3,932,929 | 1/1976 | Hallerback | 310/43 |
| 3,953,754 | 4/1976 | Hallerback | 310/43 |

*Primary Examiner*—R. Skudy
*Attorney, Agent, or Firm*—McNenny, Pearne, Gordon, Gail, Dickinson & Schiller

[57] ABSTRACT

In a laminated magnetic core wherein an adhesive is utilized to secure laminations in a unitary structure, low core compressibility is obtained by restricting the distribution of adhesive so that regions of metal-to-metal contact which surround axial compression points are kept completely free of adhesive. The core is formed by placing the laminations in assembled relation and applying a limited amount of the adhesive in a liquid state to selected core surface areas. Isolated interlaminar regions which lie intermediate of the axial compression regions are filled by the adhesive which flows therein by capillary action. The quantity of adhesive applied is carefully controlled so that capillary migration is contained wholly within the isolated bonding regions.

7 Claims, 6 Drawing Figures

LAMINATED STATOR CORE

BACKGROUND OF THE INVENTION

1. Field of the Invention

This invention relates to magnetic cores for inductive devices and particularly to laminated magnetic cores for dynamoelectric machines and methods of making the same.

2. Description of the Prior Art

It is well known that dynamoelectric machines such as alternating current induction motors generally utilize an annular stator core within which a rotor member is concentrically disposed. The stator core is usually formed of a stack of thin laminations having suitable slots and teeth which define winding receiving openings and a circular bore for receiving the rotor member. Additionally, a number of through bolt holes are usually disposed at angularly spaced locations near the outer periphery of each lamination.

The laminations must be held in precise alignment with each other to provide a uniform air gap between the stator core and rotor member. A slight distortion of the air gap may cause a reduction in starting torque and output power, and a misaligned rotor may cause an increase in bearing wear. Misalignment and radial shifting may occur when the core is subjected to unbalanced torsional loading as the stator core is bolted down to a planar mounting surface. Therefore the laminations must be interconnected one to another to form a rigid assembly.

A widely practiced method of interconnecting the laminations to form a rigid, unitary core structure is known wherein a varnish or other suitable adhesive is interposed between laminations to prevent radial shifting. Generally, the assembled core is held in a suitable fixture and dipped in a varnish to allow a thin coating of varnish to be deposited between laminations as the varnish is drawn within by capillary action. After curing, the adhesive binds the laminations rigidly together, thus preventing relative movement.

In laminated core structures where adhesive bonding is utilized, problems have arisen in connection with thermoplastic flow of the adhesive when the core is heated to high temperatures during the curing process and also during thermal cycling incident to normal operation. Where thermoplastic flow has occurred within regions of high pressure concentration, e.g., in regions immediately surrounding through bolt holes, the low compressibility characteristic of the core is substantially degraded which results in a loss of torque retention. This situation is particularly serious in those installations where through bolts are employed to secure the core to a planar surface in a cantilever mounting arrangement and the stator is held in concentric relation with a rotor member solely by the through bolts. For example, in hermetically sealed refrigeration motor compressor units, the stator core is frequently mounted in a cantilever fashion by means of through bolts which hold the stator in axial compression with a planar mounting surface. A loss of torque retention causes shifting of the entire stator core with respect to the rotor member as the through bolts loosen. In addition to the usual degradation in performance caused by a non-uniform air gap as discussed above, the stator may slip enough to cause the rotor member to rub against the slot teeth, thus causing lock-up of the rotor.

Many attempts have been made heretofore to minimize shifting in adhesive impregnated cores. For example, it is known to use laminations having unusually rough surface texture in combination with a uniform distribution of adhesive throughout interlaminar regions. The unusually rough surfaces are said to provide metal-to-metal point distributed contact with the adhesive distributed therebetween. However, any advantage provided by this structure is often offset by the corresponding reduction in power output which necessarily results from a decrease in core density caused by the excessive surface roughness.

It is also known to use laminations having normal surface roughness in combination with an uneven distribution of adhesive between laminations. This structure requires that the pressure concentration points, e.g., the through bolt hole regions, to be held under greater compression than is applied during normal operation so that all interlaminar spaces are filled, but with a lesser amount of adhesive migrating into the regions immediately surrounding the pressure concentration points. Because of the differential in the amount of adhesive, the laminations become deformed and assume the same relative position after repeated applications of compressive and torsional forces. However, although the amount of adhesive in the pressure concentrations regions is reduced, it is not entirely eliminated, and thermoplastic flow may be great enough to cause the through bolts to loosen.

SUMMARY OF THE INVENTION

The present invention provides a structurally stable laminated stator core having improved compressibility and torque retention characteristics. Prior known technology with respect to the adhesive bonding of laminated stator cores has reflected the generally accepted belief that a stronger bond and a structurally stable core may be achieved by spreading the adhesive in an uncontrolled amount throughout substantially the entire interlaminar volume between each pair of laminations to the extent that the entire core becomes saturated with adhesive. However, it has been determined by experimentation and observation in connection with the present invention that by selectively applying a limited amount of adhesive so that capillary migration occurs only within bonding regions which are isolated from pressure concentration regions, a rigid unitary core structure is obtained which is not affected by unbalanced torsional loading and which has greatly improved compressibility and torque retention characteristics.

The invention is based upon the observation that contrary to the teaching of prior art, adequate strength can be obtained by utilizing only limited portions of available interlaminar spaces for bonding purposes, and that it is not necessary or desirable to saturate the entire core structure. Furthermore, because of the thermoplastic flow of the bonding material, it is necessary to keep the regions surrounding pressure concentration points completely free of adhesive so that axial displacement does not occur in those regions as the adhesive would flow in response to temperature and pressure changes.

Accordingly, a laminated core is provided in which individual laminations are secured together into a unitary, rigid structure by a predetermined, minute amount of adhesive. The core is formed by placing the laminations in assembled relation and applying a predetermined amount of adhesive in liquid state to selected core surface areas. Isolated interlaminar regions which lie intermediate of the axial pressure concentration regions are filled by the adhesive which flows therein by capillary action. The quantity of adhesive applied is carefully controlled so that capillary migration is contained wholly within the isolated bonding regions, with the axial pressure concentration regions remaining completely devoid of adhesive after migration has terminated. The extent of the bonding regions relative to the extent of the pressure concentration regions is determined by a consideration of the minimum bonding area required to provide the desired shear strength, and of the minimum interface area surrounding each through bolt hole which must be kept clear of bonding material to provide a compressibility characteristic which approaches the compressibility of an unbonded core.

BRIEF DESCRIPTION OF THE DRAWINGS

The invention will be more fully understood from the following detailed description taken in connection with accompanying drawings, in which.

DESCRIPTION OF THE PREFERRED EMBODIMENT

Figure 1:
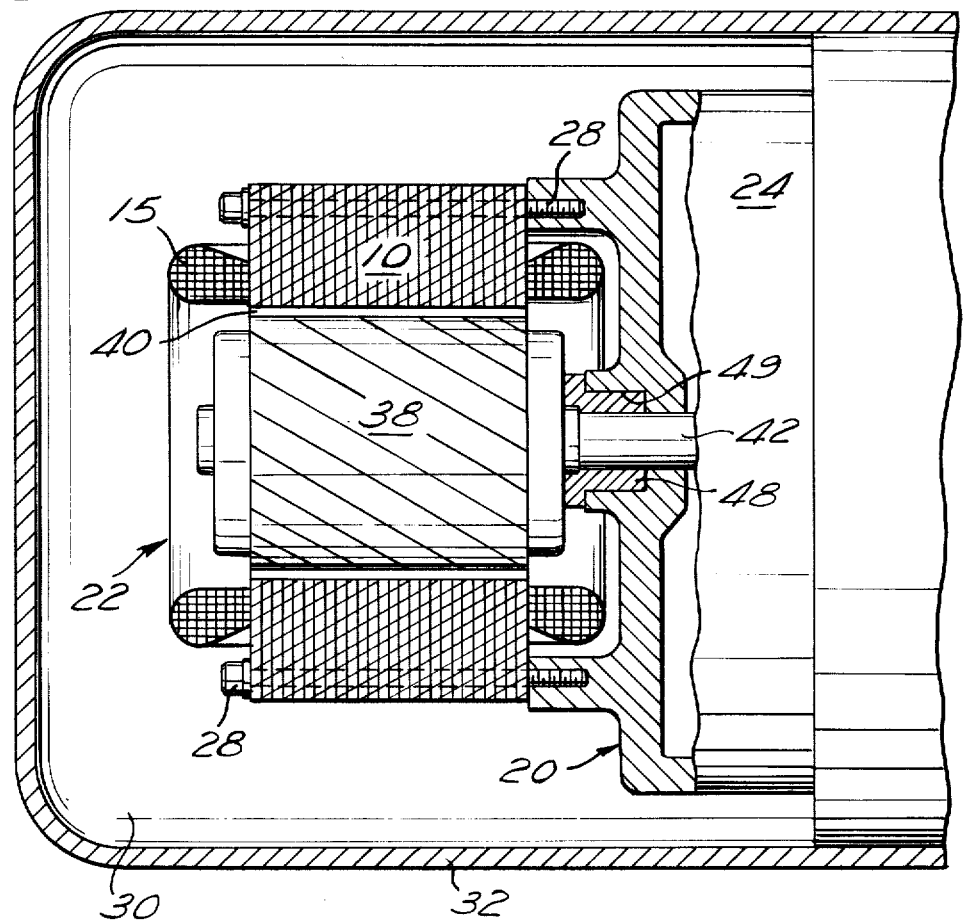
FIG. 1 is a side elevation view, partly in section, of a motor compressor unit in which the invention is incorporated.

Referring to FIG. 1 of the drawing, a laminated stator core 10 constructed according to the teachings of the present invention is shown incorporated in a hermetically sealed motor-compressor assembly 20. The motor-compressor assembly 20 includes an electric motor 22 which is mounted directly to a compressor 24 by means of through bolts 28. The motor-compressor 20 is enclosed in a chamber 30 by a housing 32 which may be of any suitable standard construction. The motor 22 is of standard construction and comprises a rotor member 38 which is concentrically disposed within an axial bore 39 (See FIG. 3) of the stator core 10 with a uniform air gap 40 therebetween. A shaft 42, which supports the rotor 38, is journaled within a sleeve bearing 48 which is disposed within a tubular recess 49 of the compressor 24. In this particular arrangement, the shaft 42 drives a reciprocating piston (not shown) in the compressor unit 24 in the usual manner. The rotor 38 may be of any suitable construction such as the squirrel cage type.

Figure 2:
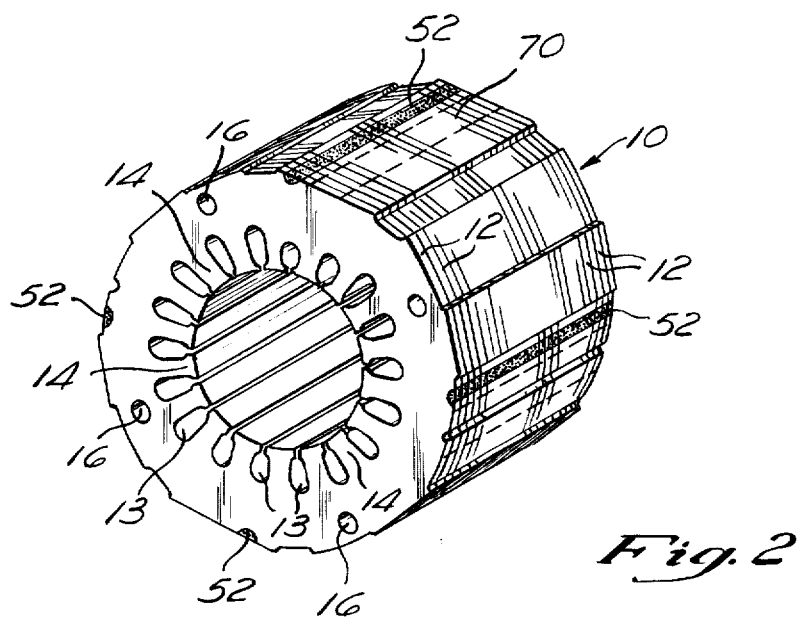
FIG. 2 is an isometric view of a laminated stator core which is constructed according to the teachings of the present invention.

The present invention is particularly directed to forming the stator core 10 into a unitary, rigid structure as is illustrated in FIGS. 1 and 2. The stator core 10 generally includes a stack of thin laminations 12 which are stamped from magnetic sheet material, such as steel which may be of any suitable thickness and surface texture. In the present construction, the laminations 12 are stamped from 0.018 inch thick sheet steel previously cold finished to provide a surface roughness between approximately 20 and 100 microinches RMS.

Each lamination 12 is provided with corresponding slot openings 13 on the inner periphery thereof which are separated by slot tooth portions 14. When the laminations are properly aligned in the usual manner, axially extending winding receiving slot openings and the centrally disposed, circular bore 39 are provided for receiving a field winding 15 and the rotor 38, respectively. Circumferentially spaced holes 16 are located near the outer periphery of each lamination 12 for receiving the through bolts 28.

As previously discussed the stator core 10 is secured to the compressor housing 32 by a plurality of through bolts 28 which are tightened to impart relatively high compressive forces at equally spaced pressure points near the outer periphery of each lamination 12. It should be noted that the stator core 10 is mounted independently of the rotor 38 and so must be accurately positioned under a constant compressive force to maintain concentric alignment with the rotor. Accordingly, it is desirable that the stator core 10 be interconnected or bonded in such a manner that the individual laminations 12 will resist radial shifting and the composite core 10 will maintain minimum compressibility under varying structural load and temperature conditions.

In accordance with the present invention the laminations 12 are interconnected by a bonding material 50 which is deposited between the laminations in selected regions by capillary migration. The individual laminations 12 are prepared for bonding by degreasing, annealing and bluing in the usual manner. The finished laminations 12 are aligned one to another in a stack and may be strip welded under axial pressure to maintain alignment and to facilitate handling during bonding and final assembly. An arrangement of weld beads 52 disposed axially along the outer surface of the stack to secure the laminations 12 in assembled relation is illustrated in FIG. 2. The stack is then placed on an aligning arbor (not shown) which may be of any suitable configuration.

Figure 3:
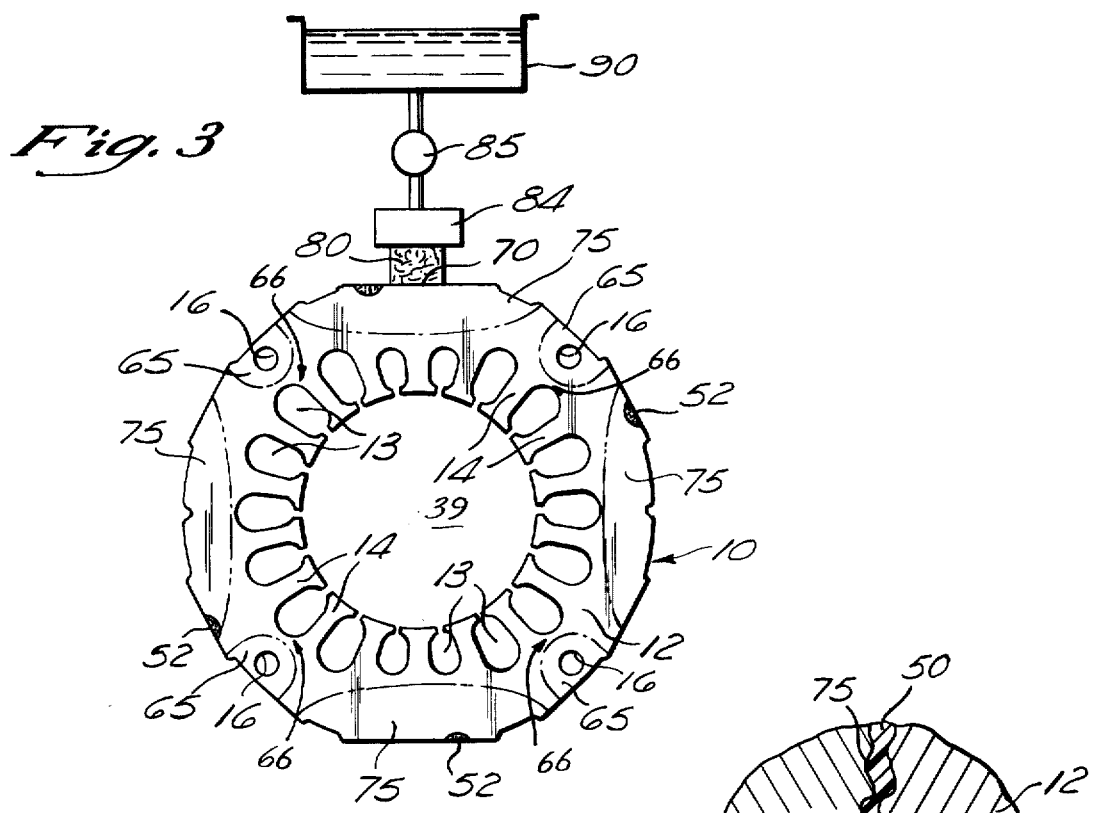
FIG. 3 illustrates a method of applying bonding material to the stator core of FIG. 2.

After the core 10 has been suitably fastened to an arbor, a controlled quantity of the liquid bonding material 50 is applied to selected peripheral core surface areas 70 as shown in FIG. 3. The areas of application 70 are shown more clearly in FIG. 2 and are indicated by dashed lines which extend axially along the outer periphery of the core 10. Isolated interlaminar bonding regions 75 lie beneath the areas of application 70 and are disposed intermediate of axial pressure concentration regions 65 which surround the through bolt holes 16. The interlaminar bonding regions 75 are filled with the bonding material 50 which flows therein by capillary migration.

Figure 5:
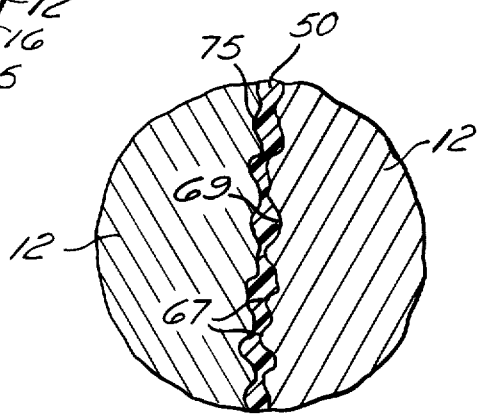
FIG. 5 is a magnified view of the interface bonding arrangement of next adjacent laminations in the stator core of FIG. 4.
Figure 4:
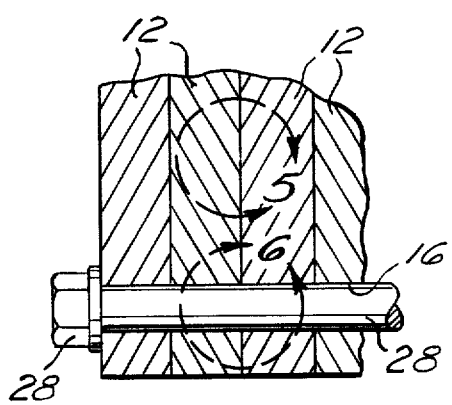
FIG. 4 is a fragmentary view of a part of the stator core of FIG. 2.
Figure 6:
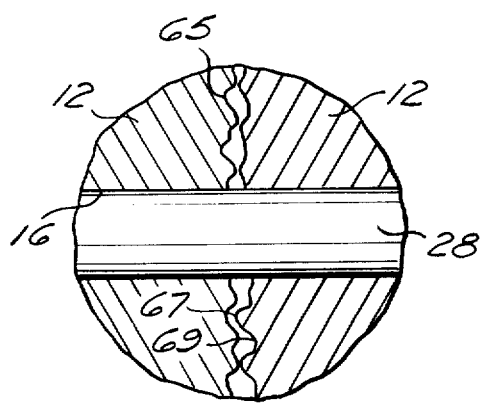
FIG. 6 is a magnified view of the pressure concentration region surrounding a through bolt in the stator core of FIG. 4.

An enlarged fragmentary view of the core 10 is shown in FIGS. 4, 5 and 6 to illustrate the distribution of the adhesive material 50 between the adjacent laminations 12. Because of surface roughness, facing surfaces of next adjacent laminations have minute, finely spaced irregularities which appear in profile as randomly spaced peaks 67 and valleys 69. The union of the peaks and the valleys establish points of metal-to-metal contact which are surrounded by interlaminar spaces. The points of metal-to-metal contact which surround areas of axial pressure concentration, such as the areas 65 immediately surrounding the through bolt holes 16, define the pressure concentration regions 65 which must be kept free of the bonding material 50. The remaining points of metal-to-metal contact and interlaminar spaces which lie intermediate of the pressure concentration regions define the bonding regions 75.

It should be noted that the isolated axial pressure concentration regions 65 surrounding the through bolt holes remain completely free of bonding material after migration is terminated, the measured quantity of bonding material 50 being exhausted within the prescribed bonding regions 75. Thus, the pressure concentration regions 65 which surround the through bolt holes 16 remain devoid of the bonding material 50 so that expansion and thermoplastic flow cannot occur in those regions.

The quantity of bonding material applied to each core surface area 70 must be carefully controlled so that capillary migration will be contained wholly within the prescribed interlaminar bonding regions 75. The exact amount of bonding material required will depend upon the physical characteristics of each core, and will vary with such factors as core diameter, lamination thickness and surface texture, temperature, and viscosity of the material selected. It has been experimentally determined that for ambient temperature of 70° F, and a core having a diameter of 5 inches and laminations 0.018 inch thick with an average surface roughness of 30 microinches RMS, 0.31 grams of an acrylic resin varnish, such as DuPont Lecton RK-6305 or RK-6323 should be applied per square inch of desired interlaminar bonding surface area per inch of core length. Lecton is provided by the manufacturer in a solution which is nominally 35% solids, and should be diluted by the addition of a solvent such as water to reduce the concentration to approximately 22% solids for this application.

The bonding material 50 may be applied in any convenient manner, for example by a syringe, or it may be applied by means of a swab 80 as illustrated in FIG. 3. Since the bonding material 50 tends to migrate radially outwardly from the area of application, the width of the swab 80 should be small as compared with the distance between through bolt holes 16. In the present example where through bolt holes 16 are separated by approximately 3 inches, a felt swab 80 which is 0.5 inch wide by 0.125 inch thick and extending the length of the core 10 is preferred. The swab 80 is initially saturated with the bonding material 50 and is pressed lightly against the selected core surface areas 70. A predetermined quantity of the bonding material 50 is applied to the swab 80 from a reservoir 90 through a suitable meter 85 and distributor 84. It has been determined for the example given herein that the desired amount of bonding material will enter the core by capillary action within 30 seconds and that capillary migration within the core will have completely terminated shortly thereafter.

A bonding material other than Lecton acrylic varnish may be used to good advantage, and the Lecton example is disclosed herein only for purposes of illustration. However, certain epoxy varnishes have not proven to be satisfactory for this application.

The desired shear strength of the finished core depends upon the solid content of the bonding material and the amount of interface area covered for each lamination. The shear strength tends to increase as the solid content increases, but capillary migration is reduced correspondingly. It has been determined that a concentration of solids in the range of 20% to 30% by weight will provide uniform distribution, rapid migration, and adequate shear strength per unit of bonding area.

In determining the total interface bonding area required per lamination, the degree of core compressibility desired should be considered. In general, the compressibility of the core decreases as the amount of bonding material and interface bonding area decreases. (By the term core compressibility, it is meant the incremental change in axial length of a core per incremental change in applied compressive force.) Thus, a trade off exists between shear strength and core compressibility, and an optimum ratio of bonded interface area to unbonded interface area, hereinafter referred to as the bonding area ratio, may be predicted or determined experimentally for a given core.

In the present example, a bonding area ratio slightly greater than 1:1, with the bonded region 75 located intermediate of pressure concentration regions 65 surrounding the through bolt holes 16 as illustrated in FIG. 2, has provided excellent shear strength and low core compressibility. As discussed previously it is essential to keep the pressure concentration regions 65 surrounding the through bolt holes 16 completely free of the bonding material 50 so that thermoplastic flow does not occur in these regions. Thus, the upper limit for the bonding area ratio will be determined by the extent of the pressure concentration region 65 established by the fastening means, which in the present example is the diameter of the through bolt head 27. However, since core compressibility is of more importance than shear strength in the present application, and since materials such as the acrylic resin bonding material 50 have a much greater coefficient of thermal expansion than the steel laminations 12, a bonding area ratio in the lower range is preferred.

The core 10 is pressed and squared in the usual manner prior to and after impregnation and areas 66 between the axial pressure concentration regions 65 and the bore 39. Further curing depends upon the solid content of the bonding material 50. In the present example, the core 10 is subsequently baked at 180° F for a 45 minute period and at 350° F for 2 hours to cure the bonding material 50.

It should be apparent that the present invention is readily adaptable to automation and that procedures directed to the removal of excess bonding material from parts or tooling are not required. Minimum core compressibility consistent with adequate shear strength is obtained by applying a limited quantity of bonding material which is minute as compared with the uncontrolled amounts utilized in fully saturated laminated cores. A laminated core constructed by the method of this invention is especially suitable for use in motor-compressor applications wherein a compressive cantilever mounting arrangement of the stator core is relied upon to maintain a uniform air gap between it and the rotor member.

While a particular embodiment of the invention has been shown and described for the purpose of illustration, other arrangements and embodiments may be practiced by those skilled in the art without departing from the scope and spirit of the invention. It is not desired, therefore, that the invention be limited to the specific arrangement described herein.

What is claimed is:

1. A laminated magnetic core comprising a plurality of magnetic laminations arranged in abutting relation in a stack having opposite end surfaces, a circumferential side surface, and an axial bore adapted to receive a rotor member, said lamination defining interlaminar regions, each lamination having at least two spaced apart pressure points for receiving axially directed compressive forces applied to said end surfaces of said stack, said laminations being secured together in a unitary structure by partial saturation and penetration of said stack with a minute, predetermined amount of adhesive material disposed within a portion of said interlaminar regions, said portion constituting interlaminar bonding regions situated intermediate of and isolated with respect to each other and another portion of said interlaminar regions, said another portion constituting interlaminar regions of axial pressure concentration which surround said pressure points, said interlaminar bonding regions and said interlaminar regions of axial pressure concentration constituting only part of said interlaminar regions, said axial pressure concentration regions and said interlaminar regions other than said interlaminar bonding regions being completely free of said adhesive material, said regions free of adhesive including interlaminar regions between said axial pressure concentration regions and said bore, said adhesive material being applied to preselected side surface areas of said core, said adhesive material entering between adjacent laminations and migrating therein by capillary action, the areas of application being circumferentially intermediate of said pressure concentration regions and extending axially along the length of said core, the amount of adhesive material being limited to the quantity required to sustain capillary migration only within said isolated interlaminar bonding regions, said amount being insufficient to sustain further capillary migration from said isolated interlaminar bonding regions into said interlaminar regions other than said interlaminar bonding regions.

2. The laminated magnetic core of claim 1 wherein facing surfaces of next adjacent laminations have minute, finely spaced irregularities which appear in profile as randomly spaced peaks and valleys, the union of peaks and valleys of said facing surfaces establishing points of metal-to-metal contact which are surrounded by interlaminar spaces; the points of metal-to-metal contact immediately surrounding each axial pressure point defining said pressure concentration regions; the remaining points of metal-to-metal contact and interlaminar spaces which lie intermediate of said pressure concentration region defining said interlaminar bonding regions.

3. The laminated magnetic core of claim 2 wherein the axial thickness of said adhesive disposed within said interlaminar bonding regions does not exceed the axial clearance afforded by said valleys of said facing surfaces of next adjacent laminations, thereby providing for cohesion and metal-to-metal contact between adjacent laminations in said interface bonding regions.

4. The laminated magnetic core of claim 1 wherein the bonded interface area is substantially equal to the pressure concentration interface area.

5. The laminated magnetic core of claim 1 wherein said adhesive material comprises an acrylic resin varnish having a solids concentration in the range of 20% to 30% by weight.

6. The laminated magnetic core of claim 1 wherein said laminations have a surface roughness from 30 to 100 microinches RMS and the amount of adhesive material applied to said preselected surface application area is 0.25 to 0.35 grams per square inch of interface bonding area per inch of axial core length.

7. The laminated magnetic core of claim 1, the outer periphery of said core having a plurality of spaced apart, axially extending weld beads securing said laminations in assembled relation.

* * * * *